United States Patent

[11] 3,537,388

| [72] | Inventor | Edward J. Martin<br>4909 Fremont Ave. S., Minneapolis,<br>Minnesota 55409 |
|---|---|---|
| [21] | Appl. No. | 818,004 |
| [22] | Filed | April 21, 1969 |
| [45] | Patented | Nov. 3, 1970 |

[54] CAMP GRILL AND REFLECTOR OVEN
10 Claims, 7 Drawing Figs.

[52] U.S. Cl. .................................................. 99/421,
126/9, 126/30, 126/274
[51] Int. Cl. ....................................................... A47j 37/00,
F24b 3/00, F24c 1/16
[50] Field of Search ............................................ 126/25,
25A, 9, 9(A), 9(B), 30, 29, 274; 99/421

[56] References Cited
UNITED STATES PATENTS

| 2,827,846 | 3/1958 | Karkling | 126/274UX |
| 2,839,043 | 6/1958 | La Born | 126/9X |
| 2,943,557 | 7/1960 | Suehlsen | 126/274UX |
| 3,067,737 | 12/1962 | Brown | 126/30X |
| 3,101,080 | 8/1963 | Lorbacher | 126/25(A)UX |
| 3,359,887 | 12/1967 | Cleveland | 126/25(A)UX |

Primary Examiner—Charles J. Myhre
Attorney—Williamson, Palmatier and Bains

ABSTRACT: A readily adjustable camp grill collapsible into small compass and incorporating a reflector oven for baking over an open fire.

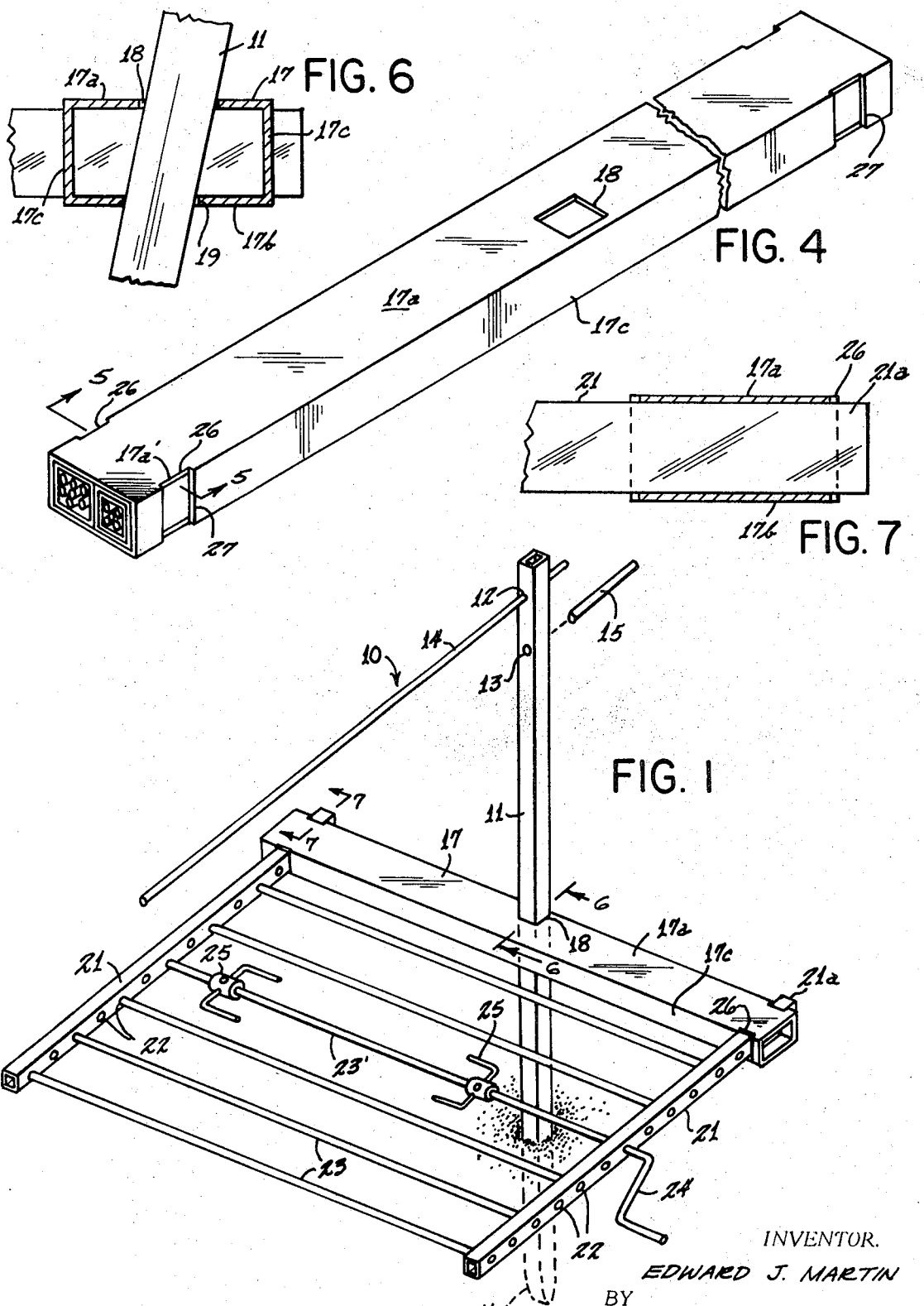

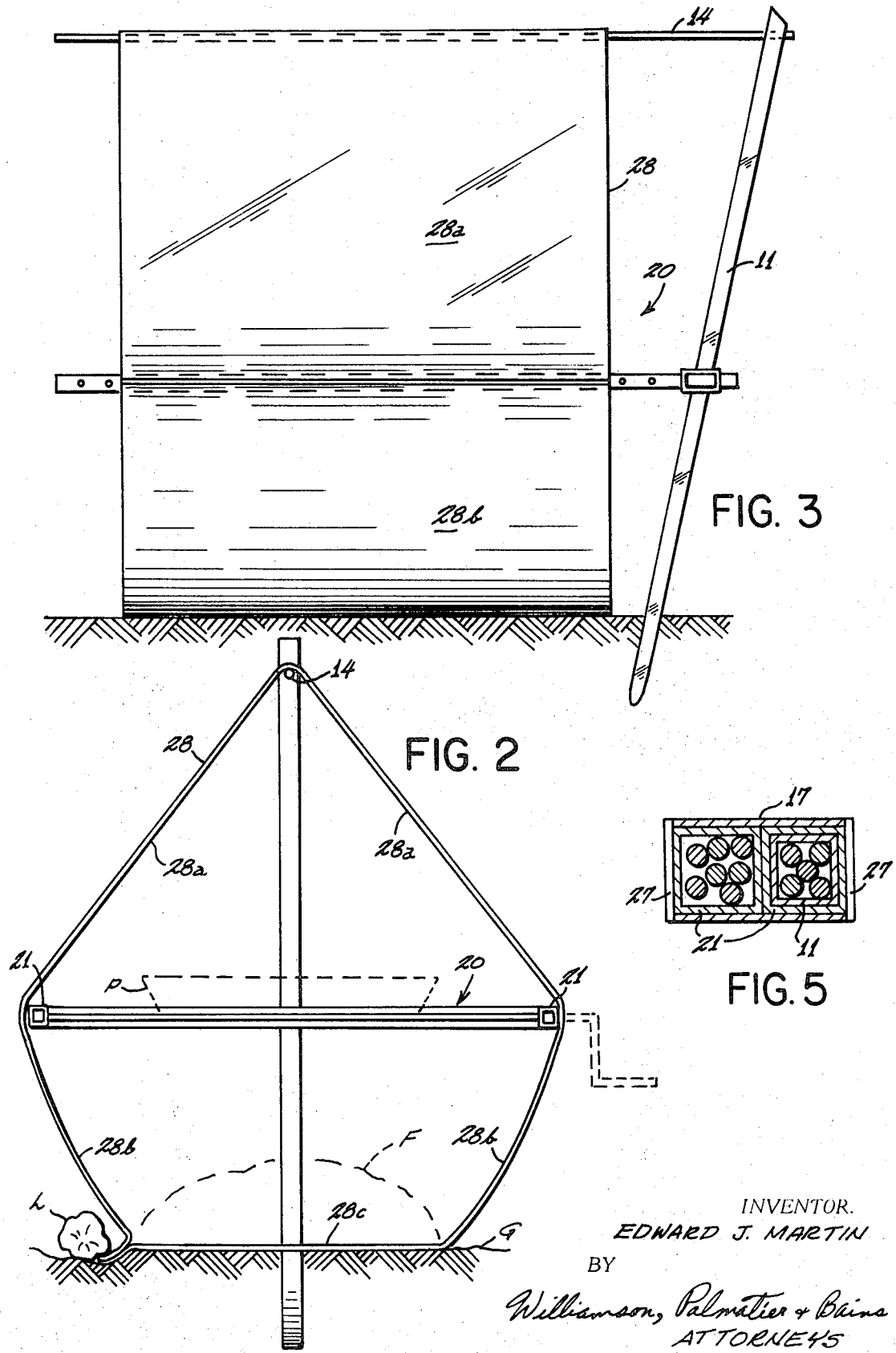

CAMP GRILL AND REFLECTOR OVEN

An object of my invention is to provide a new and improved camp grill of simple and inexpensive construction and operation.

Another object of my invention is the provision of a novel camp grill which defines a double reflector oven to facilitate baking pastries and other food dishes over an open fire.

Still another object of my invention is to provide an improved camp grill which is light in weight, readily collapsible for cleaning and storing in compact and nested condition.

These and other objects and advantages of my invention will more fully appear from the following description made in connection with accompanying drawing, wherein like reference characters refer to the same or similar parts throughout the several views, and in which:

FIG. 1 is a perspective view of the camp grill with the oven-defining sheet material removed for clarity of detail.

FIG. 2 is a front elevation view of the assembled grill and reflector oven.

FIG. 3 is a side elevation view of the assembled grill and reflector oven.

FIG. 4 is a perspective view showing the camp grill in collapsed and nested condition.

FIG. 5 is a detail section view taken approximately at 5–5 in FIG. 4.

FIG. 6 is a detail perspective view taken approximately at 6–6 in FIG. 1.

FIG. 7 is an enlarged detail section view taken approximately at 7–7 in FIG. 1.

One form of the present invention is shown in the drawings and is described herein. The camp grill is indicated in general by numeral 10 and includes a square tubular rigid post 11 having a pointed lower end 11a to facilitate insertion into the ground adjacent the location where the camp fire F diagrammatically illustrated in FIG. 2, is to be built. The post 11 has a pair of apertures 12 and 13 therein, the aperture 12 removably receiving an elongate, rigid rod 14 to extend substantially horizontally from the top of the post. In FIG. 3 it will be noted that it is ordinarily contemplated that the post 11 will be inserted into the ground in a slightly oblique position, and therefore the apertures 12 of the post are slightly oblique to a perpendicular so that the rod 14 will be held in a substantially horizontal position. The aperture 13 is somewhat larger and removably receives a handle-forming rod 15 of somewhat larger diameter as compared to rod 14 to facilitate applying manual pressure downwardly for insertion of the post 11 into the ground.

The camp grill 10 also includes a tubular crossbar 17 of rectangular shape, with flat top and bottom panels 17a and 17b which are connected together by upright side panels 17c. The top and bottom panels have openings 18 and 19 therein for slidably receiving the post 11, and for producing a friction lock relationship between the post and the crossbar 17 whereby the crossbar will remain fixed in one position on the post, until it is actually intentionally moved to a new location. The openings 18 and 19 are aligned with each other, but somewhat obliquely through the crossbar 17 so as to accommodate the inclination of the post 17, while maintaining the crossbar in substantially level condition.

The crossbar is part of a grill structure 20 which is supported on the post 11 and is normally maintained well above the ground G in the normal use of the camp grill 10, and the grill 20 is principally for the purpose of supporting the food being prepared. The grill 20 also includes a pair of side rails or arms 21, which are constructed of square tubing and which have a plurality of apertures 22 horizontally therethrough. The apertures 22 facilitate the mounting of a plurality of rods 23, the ends of which are removably inserted into the apertures 22 of the side rails. One of the rods 23' may be provided with a crank handle 24 at one of its extreme ends, and may also be provided with a pair of impaling forks 25 fastened by set screws to the rod 23' so that a roast or chicken, or some other meat dish, may be carried on the rod 23 and rotated over the fire. It should be noted that the rods 23 and 23' may be at various spacings and may be interchangeably removed and rearranged, depending upon the exact use to which the grill 20 is being put at any particular time. If only the rod or spit 23' and the forks are being used, most of the other rods 23 may be removed from the grill. On the other hand, if steaks or hamburgers are being broiled directly on the grill, the rods 23 may be spaced closely to each other, in each of the apertures 22 so that the meat will be adequately supported during broiling. If a kettle or baking pan P as illustrated in FIG. 2 in dotted lines is being supported on the grill 20, the rods 23 may be widely spaced as there is no need for closely spaced rods in supporting such a pan.

The inner ends 21a of the side rails 21 are supported in sockets 26 which are defined in the crossbar 17 adjacent the opposite ends thereof. The sockets 26 are defined by openings 27 in the side panels 17c of the crossbar. The openings 27 extend throughout the entire height of the side panels so as to actually expose edge surfaces 17a' of the top panel 17a. This form of socket 26 facilitates reception of the inner end portions 21a of the side rails whereby the side rails lie flush against both the upper and lower panels 17a, 17b, as seen in FIG. 7 so as to support the side rails across the entire width of the crossbar 17, and thereby minimize the likelihood of unnecessary wear and damage to the crossbar and prevent sagging of the side rails 21 and the rods 23 with respect to their desired positions.

The camp grill also includes a reflective hood, which is indicated in general by numeral 28, and which in the form shown is constructed of a strip of heat reflective aluminum foil which is flame resistant. As illustrated in FIGS. 2 and 3, the rod 14 supports the central portion of the aluminum foil which is draped thereover in elevated position with respect to the grill 20, and substantially flat panels 28a of the flexible aluminum foil extend downwardly and outwardly and are draped over and around the side rails 21. The depending portions 28b extend downwardly toward the ground G from the side rails 21, and one portion 28c of the aluminum foil is preferably laid on the ground and underneath the fire F. The other free ends of the foil may be fastened together in any of a number of ways, or weighted down adjacent the fire, as by a log L. Alternately, the free edges of the foil may be held together with some type of fastener such as staples or clips, but it is preferable that the aluminum foil be draped to the ground.

It should be noted that the strip of aluminum foil or hood 28 forms a double reflector oven directing heat from the fire to the pan P carried on the grill 20 for baking a cake or otherwise cooking or roasting food on the grill. It should further be noted that the rod or spit 23' may be assembled with the aluminum foil in the grill so as to facilitate use of the double reflector oven during roasting of a piece of meat or fowl. In this instance, the handle 24 of the rod 23' need only be extended through the readily rupturable aluminum foil so as to facilitate ready and easy turning of the meat on the rod 23' and forks 25.

It should be particularly noted that the entire camp grill 10 is readily and easily disassembled and that all of the parts, the rods 23, side rails 21, crossbar 17, the post 11 and rod 14 are all smooth and unobstructed with various attachments, and each of these may be therefore very easily cleaned or scrubbed and polished. When the camp grill 10 is to be stored, all of the parts thereof may be readily and easily nested together and confined in small compass. The side rails 21 may be laid side by side and slipped into the crossbar 17; the post 11 may be slipped into one of the side rails 21, and the several rods 23 and 14 may be inserted into the remainder of the space within side rail 21 and post 11 as illustrated in FIG. 5.

The grill may be readily and easily assembled by utilizing the handle 15 to assist in thrusting the post 11 into the ground. The crossbar 17 may be assembled onto the post and positioned at the desired height. The side rails 21 and a sufficient number of rods 23 may be inserted so as to adequately support the load which is to be used.

The double reflector oven is applied by simply draping a length of aluminum foil over the rod 14 and around the side rails 21 and extending the aluminum foil to the ground and under the fire which is to be built so as to reflect all of the available heat upwardly and then to the food being cooked on the grill.

When the use of the grill 10 is completed at any one location, the very inexpensive aluminum foil may be disposed of and the remainder of the camp grill may be readily and easily cleaned for storage and transport.

It will be seen that I have provided a new and improved camp grill incorporating a simple and inexpensive double reflector oven by simply draping a piece of aluminum foil over a horizontal rod supported on the post and also draping the aluminum foil over the side rails of the vertically adjustable grill which is readily adaptable to supporting various types of loads, either by spacing the rods close together for directly carrying the meat or widely apart for carrying pans or simply by supporting a rotatable spit for roasting a piece of meat or fowl.

It will, of course, be understood that various changes may be made in the form, details, arrangement and proportions of the various parts without departing from the scope of my invention.

I claim:
1. A camp grill for cooking and baking, comprising:
an upright support;
a grill on the support to carry a receptacle above the fire, the grill having side rails opposite each other;
a rod on the support in superposed and spaced relation above the grill; and
a strip of flame resistant flexible sheet material draped over said rod and side rails and downwardly therefrom to reflect heat from the fire to said receptacle.

2. The camp grill according to claim 1 wherein said grill also includes a rod extending between said side rails and rotatably supported thereon, the rod having means supporting a chunk of meat thereon and facilitating roasting of the meat.

3. A camp grill for cooking and baking, comprising:
an upright support;
a collapsible grill removably mounted on the support and having removable side rails opposite each other;
a rod removably mounted on the support and spaced above the grill in parallel relation to the side rails; and
a strip of flame resistant reflective sheet material draped over said rod and side rails and downwardly therefrom to confine the fire beneath the grill and reflect heat therefrom upwardly to the food being prepared on the grill.

4. A camp grill comprising:
an upright post supported from the ground;
a crossbar removably mounted on the post and slidably adjustable to various heights thereon;
a pair of side rails with inner ends removably mounted in sockets in said crossbar, said side rails having a plurality of apertures along the length thereof; and
a plurality of rods extending between said side rails and removably mounted in the apertures thereof.

5. The camp grill according to claim 4 and said post having an aperture therethrough and a handle-forming rod removably mounted in said aperture and facilitating manual insertion and removal of the post from the ground.

6. A camp grill for cooking and baking, comprising:
an upright support;
a grill on the support to be spaced above the fire for carrying the food being prepared;
a reflective hood having an elevated central portion spaced above the grill and having side portions extending downwardly toward the opposite sides of the grill whereby to confine the area above the grill and reflect heat onto the food being prepared from the fire beneath the grill; and
means on the support carrying the hood.

7. The camp grill according to claim 6 wherein said hood includes a pair of substantially flat panels extending divergently with respect to each other and downwardly from the elevated central portion and toward the opposite sides of the grill.

8. The camp grill according to claim 7 and said hood also having portions extending from the sides of the grill and downwardly to the ground to confine the fire and reflect heat upwardly therefrom.

9. A camp grill comprising:
an upright post supported from the ground;
a tubular crossbar with a rectangular shape and having side panels and flat top and bottom panels;
the crossbar having aligned post receiving openings in said top and bottom panels for mounting the crossbar on the post and locking the crossbar in various positions along the post, the crossbar also having openings through said side panels entirely between the top and bottom panels and adjacent opposite ends of the crossbar;
a pair of cantilever side rails with inner ends extending through the openings in said side panels of the crossbar and lying flush against both the top and bottom panels of the crossbar, said side rails having a plurality of apertures along the length thereof; and
a plurality of rods extending between said side rails and removably mounted in the apertures thereof.

10. The camp grill according to claim 9 and including a removable rod carried on the post and extending over the grill and in spaced relation therefrom and parallel to said side rails, and a strip of heat-reflective metallic foil draped over said rod and side rails, and downwardly to the ground to reflect heat from the fire, and said post, rods, and side rails being entirely demountable and interfitting each other telescopically within the tubular crossbar for storage in small compass.